Patented Aug. 6, 1940

2,209,981

UNITED STATES PATENT OFFICE 2,209,981

TREATMENT OF ETHYL CHLORIDE CATALYST

Alex C. Keyl and Robert D. Blue, Midland, Mich., assignors to The Dow Chemical Company, Midland, Mich., a corporation of Michigan No Drawing. Application September 1, 1936, Serial No. 98,925

5 Claims. (Cl. 204—9)

This invention concerns a method of preparing liquid catalytic media to be employed in producing ethyl chloride by the direct addition of hydrogen chloride to ethylene, and to the treatment of such media during their use.

According to one method for carrying out said addition reaction, a mixture of ethylene and hydrogen chloride in approximately equimolecular proportions is passed into a liquid catalytic medium prepared with aluminum chloride, maintained at a relatively low temperature, under substantially anhydrous conditions, and at approximately atmospheric pressure. A suitable medium can be made by dissolving or suspending aluminum chloride in certain chlorinated aliphatic hydrocarbons. However, after a relatively short period of use such liquid catalytic medium becomes inactive to promote the addition reaction and must be replaced, or fresh catalyst added thereto. The intermittent addition of solid aluminum chloride to the liquid medium calls for the handling of a very hygroscopic substance and thorough mixing to avoid local concentrations of the catalyst, and, in general, results in only relatively low yields of ethyl chloride per unit of catalyst used, i. e. only 5 to 40 parts by weight of ethyl chloride are obtained per part of catalyst.

Among the objects of this invention are to provide (1) a convenient way of preparing a liquid catalyst medium suitable for use in carrying out the above-described addition reaction, whereby relatively high yields of ethyl chloride can be obtained per pound of catalyst employed; and, (2) a method by which spent liquid catalyst medium can be at least partially reactivated and fresh catalyst incorporated therewith in a convenient manner without the necessity of handling an anhydrous metal halide. The invention, then, consists of the method hereinafter fully described and particularly pointed out in the claims.

Our method of preparing or treating liquid catalyst medium to be used in the reaction of hydrogen chloride with ethylene comprises the step of passing an electric current through said liquid while using an anode comprising aluminum.

In the application of our process to the reactivation and incorporation of fresh catalyst in spent liquid medium initially formed with aluminum chloride, or by the process herein described, said medium will serve as a conductor to pass current. However, in the preparation of fresh medium, it is sometimes necessary to add a substance to the organic liquid comprising the reaction medium which will lower its electrical resistance. For instance, a relatively small amount of a metal salt such as an aluminum halide can be added with beneficial results. The amount of such agent necessary is only about 0.01 per cent by weight of the organic liquid employed. If a chlorinated aliphatic hydrocarbon is employed as the liquid base in preparing catalyst medium, a small amount of an agent such as bromine, iodine, or a mineral acid, capable of promoting chemical reaction between the aluminum anode and the chloro-hydrocarbon, can advantageously be used, since such procedure permits the use of lower voltages to pass the same amount of current.

In general, we prefer to use a chlorinated aliphatic hydrocarbon in the preparation of liquid catalyst medium for the purposes indicated, and we have found that the passage therethrough of an electric current from an aluminum anode effects not only an electrical resolving of aluminum into the liquid but also promotes a chemical reaction between the chloro-compound and the metal anode. The material from which the cathode is constructed is a matter of choice, carbon or aluminum being suitable, but it is preferable to select a material which is fairly acid-resistant.

The following example illustrates the practice of our invention in reactivating partially spent catalyst:

Ethyl chloride was produced for a time by contacting a gaseous mixture of ethylene and hydrogen chloride in suitable apparatus, at the rate of 2.8 cubic feet per hour, with a catalyst solution prepared by dissolving 10 grams of aluminum chloride in 250 milliliters of tetrachloroethane. The liquid catalyst was maintained at a temperature of about 5° C. and the passage of the reacting gases thereinto continued until only about 60 per cent of the ethylene passing in contact therewith was being reacted. 372 grams of ethyl chloride was obtained, amounting to a yield of 37.2 grams of product per gram of aluminum chloride employed.

The partially spent catalyst solution was then withdrawn into a glass container provided with an aluminum anode and a carbon cathode. 1.0 ampere current at 13 volts was passed through the solution between these electrodes for 15 minutes, and thereafter 0.2 amperes at 1 volt for 45 minutes, the temperature of the solution being maintained between 5° and 10° C. during the electrolysis. The effective anode surface was 72 square inches, from which 2.1 grams of aluminum metal was resolved into the electrolyte.

A mixture of equimolecular proportions of ethylene and hydrogen chloride was then contacted with the activated catalytic liquid at the rate of 2.8 cubic feet per hour, until again only about 60 per cent of the ethylene was being reacted, whereby 594 grams of ethyl chloride was obtained without further treatment of said catalytic medium. This represents a yield of 282 grams of ethyl chloride per gram of aluminum resolved into the spent solution from the aluminum anode.

Other compounds, such as ethylene chloride, 1.1.2-trichloroethane, tetrachloroethylene, acetylene tetrachloride, propylene chloride, etc., or mixtures of the same, may be treated to yield a medium suitable for use as a catalyst in preparing ethyl chloride from hydrogen chloride and ethylene. Our method of catalyst preparation and activation does not necessarily have to be carried out intermittently, but is applicable to continuous operating systems for ethyl chloride preparation. For example, in a tower system wherein the liquid catalyst medium is continuously contacted with a gaseous mixture of ethylene and hydrogen chloride, portions of the catalytic liquid can be continuously circulated through an electrolytic chamber outside the reaction zone, in which chamber aluminum metal is continuously resolved from an aluminum anode into said circulating medium. If desired, the electrolytic activation of a liquid catalytic medium may be accomplished by placing the electrodes directly in the addition reaction zone. Each of the above modifications permits the continuous passage and reaction of gaseous reactants during the activation of the liquid catalyst and has the added advantage of not requiring a transfer of the entire body of reaction medium to a vessel outside of the reaction zone for treatment, which would, of course, result in a cessation of ethyl chloride formation.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In chemical reactions wherein a liquid catalyst consisting essentially of aluminum chloride dissolved in a chlorinated aliphatic hydrocarbon is employed, the step of periodically passing a direct electric current from an aluminum anode in contact with the aluminum chloride solution through said solution, whereby aluminum is dissolved from the anode and the catalyst is reactivated.

2. In a method wherein ethyl chloride is produced by reacting hydrogen chloride with ethylene in the presence of a catalytically active liquid consisting essentially of aluminum chloride dissolved in a liquid chlorinated aliphatic hydrocarbon and the catalyst aluminum chloride is at least partially spent, the step of passing a direct electric current from an aluminum anode in contact with the solution of partially spent catalyst through said solution, thereby dissolving aluminum from the anode and reactivating the catalyst.

3. The process according to claim 2 wherein the chlorinated aliphatic hydrocarbon solvent for the aluminum chloride is tetrachloroethane.

4. In a method of making ethyl chloride by reacting hydrogen chloride with ethylene in the presence of a liquid catalyst consisting essentially of aluminum chloride dissolved in a liquid chlorinated aliphatic hydrocarbon, the step of regenerating the catalyst without interrupting the reaction by passing a direct electric current from an aluminum anode in contact with the liquid catalyst through the latter, thereby dissolving aluminum from the anode and reactivating the catalyst.

5. In a method of preparing a catalyst medium to be used in reacting hydrogen chloride with ethylene, the steps which consist in adding to a liquid chlorinated aliphatic hydrocarbon a relatively small amount of an agent selected from the class consisting of metal halides, halogens, and mineral acids capable of promoting chemical reaction between aluminum and the chlorinated aliphatic hydrocarbon and reducing the electrical resistance of the latter, and subjecting the mixture to the action of a direct electric current supplied from an aluminum anode at least partially immersed in the chlorinated hydrocarbon whereby a substantial percentage of aluminum chloride is produced in a liquid catalyst medium in amount sufficient to promote the direct addition of hydrogen chloride to ethylene in a mixture of these reactants in contact with such medium.

ALEX C. KEYL.
ROBERT D. BLUE.